United States Patent Office 3,775,406
Patented Nov. 27, 1973

---

3,775,406
BENZALDOXIME-(s-TRIAZINYL)-ETHERS
Werner Trueb, Therwil, Switzerland, assignor to Sandoz Ltd. (also known as Sandoz AG), Basel, Switzerland
No Drawing. Filed Mar. 13, 1972, Ser. No. 234,342
Claims priority, application Switzerland, Mar. 19, 1971, 4,122/71
Int. Cl. C07d 55/46, 55/48
U.S. Cl. 260—240 G          11 Claims

ABSTRACT OF THE DISCLOSURE

The present invention concerns novel 2,6-dichlorobenzaldoxime-O-[s-triazinyl-(6)]-ethers of the formula:

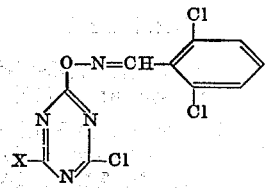

wherein X is chlorine, —$NR_1R_2$, wherein $R_1$ and $R_2$ are each hydrogen, alkyl, phenyl or phenyl substituted by chlorine, bromine, alkyl, chloroalkyl or bromoalkyl, —$SR_3$, wherein $R_3$ is alkyl or phenyl or —$OR_4$, wherein $R_4$ is alkyl or phenyl.

---

The compounds possess herbicidal activity.

The present invention relates to 2,6 - dichlorobenzaldoxime-O-[s-triazinyl-(6)]-ethers.

The present invention provides compounds of Formula I

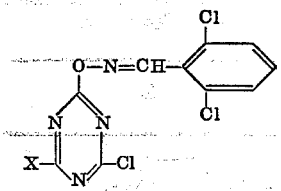

wherein X is chlorine, —$NR_1R_2$
wherein $R_1$ and $R_2$ which may be the same or different are each hydrogen, alkyl of 1 to 8 carbon atoms, phenyl or phenyl substituted by chlorine, bromine, alkyl of 1 to 8 carbon atoms, chloroalkyl of 1 to 4 carbon atoms or bromoalkyl of 1 to 4 carbon atoms,
—$SR_3$,
wherein $R_3$ is alkyl of 1 to 4 carbon atoms or phenyl or —$OR_4$,
wherein $R_4$ is alkyl of 1 to 4 carbon atoms or phenyl.

The present invention also provides a process for the production of a compound of Formula I which comprises reacting a compound of Formula II

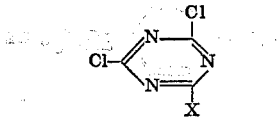

wherein X is as defined
with a compound of Formula III

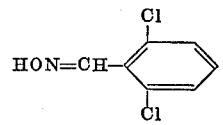

The process may for example be effected as follows:

A solvent such as acetone, acetonitrile or dioxane may be employed and the reaction may be effected in the presence of an acid acceptor such as an aqueous sodium carbonate or bicarbonate. Preferably the pH value of the reaction mixture is adjusted to between 6 and 7 by adding a 5% aqueous sodium bicarbonate solution or a 5% soda solution while stirring. The precipitation of the product may be completed by adding water and further stirring. When X of Formula II is chlorine, the reaction may be effected at reduced temperature, e.g. 0° C. Working up may be achieved in the usual manner. The compounds so obtained are generally of crystalline form which may be characterised by melting point.

The compounds of Formulae II and III are described in the literature.

The compounds of Formula I are useful as selective herbicides for use in cultivated crops as indicated by tests comprising post emergence treatment of cotton, maize and bean loci including the following weeds, with compounds of Formula I viz.

*Plantago lanceolata*
*Amaranthus retroflexus*
*Capsella bursa pastoris*
*Chenopodium album*
*Stellaria media*
*Senecio vulgaris*
*Alopecurus pratensis*
*Echinochloa crus-galli*
*Avena fatua*
*Agrostis alba*
*Apera spica venti*

The treatment comprises applying a compound of Formula I in an amount of 4 kg./hectare. Evaluation is effected 28 days after treatment.

For the above-mentioned use, the amount to be applied to a plant locus to be treated will naturally vary depending on the compound employed, the mode of application, ambient conditions, the cultivated plant to be treated, and the weeds to be combated. In general, however, satisfactory results are obtained when the compounds are applied in an amount between 1 and 6 kg./ hectare. The compounds may be applied in conventional manner, e.g. by spraying, dusting or strewing.

The compounds may be applied as a composition in admixture with herbicidal carriers and diluents.

Examples of carriers and diluents for solid compositions, e.g. dusting and strewing forms, are kaolin, diatomaceous earth, talc, chalk, limestone and cellulose powder. Such compositions may also include adjuvants such as adhesive agents, for improving adhesion of the composition to plants, dispersion agents and wetting agents.

Examples of carriers and diluents for liquid application forms are water, ketones such as acetone, alcohols, hydrocarbons, chlorinated hydrocarbons and alkyl naphthalenes.

The compositions may, in addition, include known herbicides, e.g. of the urea class, halogenated benzonitriles, carbamates and triazines.

Concentrate forms of compositions may include between 0.1 and 90%, preferably between 2 and 80%, by weight of a compound of Formula I.

Application forms of the compositions may include between 0.01 and 10% by weight of a compound of Formula I.

An example of an application dusting powder form of composition will now be described.

COMPOSITION EXAMPLE 25 parts of the active agent of general formula I, 5 parts of a condensation product from formaldehyde and naphthalene sulphonate, 2 parts of alkyl benzene sulphonate, 5 parts of dextrin, 1 part of ammonium caseinate, and 62 parts of diatomaceous earth are mixed until a homogeneous mixture is obtained, and this is then ground until the particles are considerably smaller than 45 microns as an average.

The production of compounds of the invention will now be described by way of example. Temperatures are indicated in degrees centigrade.

EXAMPLE 1

2,6-dichloro-benzaldoxime-0-[2,4-dichloro-s-triazinyl-(6)-]-ether 18.9 g. (0.1 mol) of 2,6-dichloro-benzaldoxime and 18.4 g. (0.1 mol) of cyanuric chloride are dissolved in 300 cc. of ice cold acetone and the pH value of the solution is adjusted to 6 with 5% sodium bicarbonate solution and while cooling with ice. The precipitated crystals are removed by suction, washed with 20% aqueous acetone and dried over phosphorus pentoxide. Colourless crystals having a M.P. of 132–133° are obtained.

Analysis—$C_{10}H_4Cl_4N_4O$ — molecular weight: 337.9. Calc. (percent): C, 35.1; H, 1.2; N, 16.6; O, 4.7. Found (percent): C, 36.1; H, 1.1; N, 15.9; O, 5.1.

EXAMPLE 2

2,6-dichloro-benzaldoxime-O-[2-chloro-4-ethylamino-s-triazinyl-(6)]-ether 19.3 g. (0.1 mol) of 2,4-dichloro-6-ethylamino-s-triazine and 18.9 g. (0.1 mol) of 2,6-dichloro-benzaldoxime are dissolved in 300 cc. of acetone and the pH value of the solution is slowly adjusted to 6–7 with 5% soda solution, after one hour 200 cc. of water are added and the mixture is stirred for 10 hours whereby the precipitated oil solidifies. The solid material is removed by suction, washed with 50% alcohol and dried over phosphorus pentoxide. Colourless crystals having a M.P. of 168–170° are obtained.

Analysis.—$C_{12}H_{10}Cl_3N_5O$ — molecular weight: 346.6. Calc. (percent): C, 41.6; H, 2.9; N, 20.2. Found (percent): C, 41.8; H, 3.2; N, 20.8.

In analogous manner as described in Example 2 the following compounds of general Formula I are produced:

EXAMPLE 3

2,6-dichloro-benzaldoxime-O-[2-chloro-4-methylthio-s-triazinyl-(6)]-ether

Yellow crystals with a decomposition point of 131°.
Analysis.—$C_{12}H_{10}Cl_3N_5$—molecular weight: 346.6. Calc. (percent): C, 37.8; H, 2.0; N, 16.0; S, 9.2. Found (percent): C, 38.7; H, 2.1; N, 16.0; S, 8.5.

EXAMPLE 4

2,6-dichloro-benzaldoxime-O-[2-chloro-4-methoxy-s-triazinyl-(6)]-ether

Colourless crystals having a M.P. of 127–129°.
Analysis.—$C_{11}H_7Cl_3N_4O_2$ — molecular weight: 333.6. Calc. (percent): C, 39.6; H, 2.1; Cl, 31.9; N, 16.8. Found (percent): C, 39.8; H, 2.2; Cl, 31.5; N, 16.8.

EXAMPLE 5

2,6-dichloro-benzaldoxime-O-[2-chloro-4-phenoxy-s-triazinyl-(6)]-ether

Colourless crystals having a M.P. of 120–121°.
Analysis — $C_{16}H_9Cl_3N_4O_2$ — molecular weight: 395.6. Calc. (percent): C, 48.6; H, 2.3; Cl, 26.9; N, 14.2; O, 8.1. Found (percent): C, 48.7; H, 2.4; Cl, 26.8; N, 14.2; O, 7.9.

EXAMPLE 6

2,6-dichloro-benzaldoxime-O-(2-chloro-4-anilino-s-triazinyl-(6))-ether

Colourless crystals having a M.P. of 153–156°.
Analysis — $C_{16}H_{10}Cl_3N_5O$ — molecular weight: 394.6. Calc. (percent): C, 48.7; H, 2.6; Cl, 27.0; N, 17.7; O, 4.1. Found (percent): C, 48.6; H, 2.7; Cl, 27.1; N, 17.3; O, 3.9.

EXAMPLE 7

2,6-dichloro-benzaldoxime-O-(2-chloro-4-amino-s-triazinyl-(6))-ether

Colourless crystals having a M.P. of 163° (decomp.).
Analysis — $C_{10}H_6Cl_3N_5O$ — molecular weight: 318.5. Calc. (percent): C, 37.7; H, 1.9; Cl, 33.4; N, 22.0; O, 5.0. Found (percent): C, 37.9; H, 2.1; Cl, 33.8; N, 22.1; O, 4.9.

EXAMPLE 8

2,6-dichloro-benzaldoxime-O-(2-chloro-4-n-octylamino-s-triazinyl-(6))-ether

Colourless crystals having a M.P. of 140–141°.
Analysis — $C_{18}H_{22}Cl_3N_5O$ — molecular weight: 430.7. Calc. (percent): C, 50.2; H, 5.1; Cl, 24.7; N, 16.3; O, 3.7. Found (percent): C, 50.5; H, 4.9; Cl, 24.7; N, 16.1; O, 4.1.

EXAMPLE 9

2,6-dichloro-benzaldoxime-O-(2-chloro-4-diethyl-amino-s-triazinyl-(6))-ether

Colourless crystals having a M.P. of 127–128°.
Analysis — $C_{14}H_{14}Cl_3N_5O$ — molecular weight: 374.6. Calc. (percent): C, 44.9; H, 3.8; Cl, 28.4; N, 18.7; O, 4.3. Found (percent): C, 45.0; H, 3.7; Cl, 28.9; N, 18.3; O, 4.5.

The following compounds of Formula I may be produced in a manner analogous to that described in Example 2, wherein X is as follows, viz.

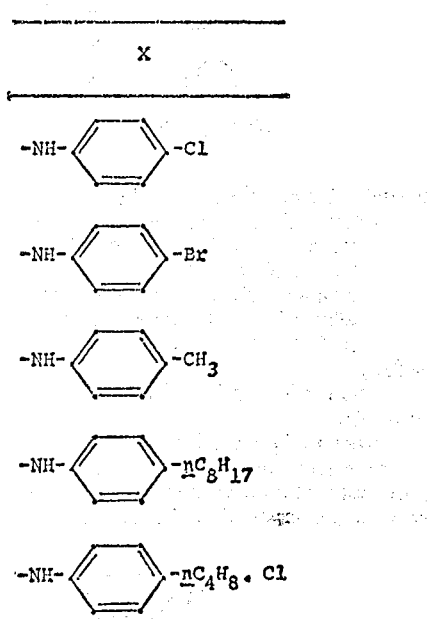

COMPOUNDS OF FORMULA I—Continued

X

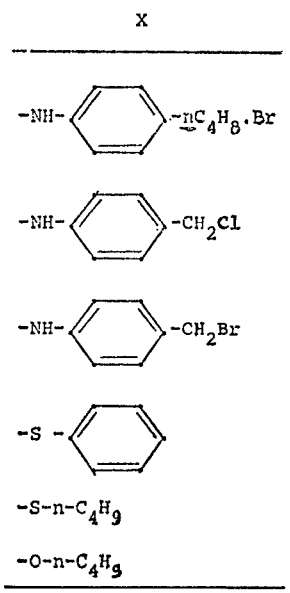

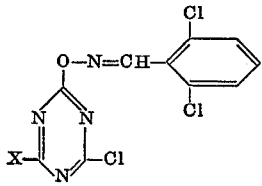

-S-n-C₄H₉

-O-n-C₄H₉

What is claimed is:
1. A compound of the formula:

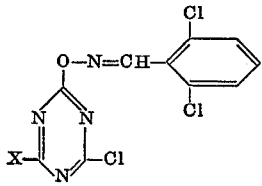

wherein X is chlorine, —NR₁R₂,
wherein R₁ and R₂ which are the same or different are each hydrogen, alkyl of 1 to 8 carbon atoms, phenyl or phenyl substituted by chlorine, bromine, alkyl of 1 to 8 carbon atoms, chloroalkyl of 1 to 4 carbon atoms or bromoalkyl of 1 to 4 carbon atoms,
—SR₃, wherein R₃ is alkyl of 1 to 4 carbon atoms or phenyl or —OR₄,
wherein R₄ is alkyl of 1 to 4 carbon atoms or phenyl.

2. A compound of claim 1, wherein X is —NR₁R₂, wherein R₁ and R₂ which are the same or different are each hydrogen, alkyl of 1 to 8 carbon atoms or phenyl, —SR₃, wherein R₃ is alkyl of 1 to 4 carbon atoms, or —OR₄, wherein R₄ is alkyl of 1 to 4 carbon atoms or phenyl.

3. The compound of claim 2, which is 2,6-dichlorobenzaldoxime-O-[2,4-dichloro-s-triazinyl-(6)]-ether 4. The compound of claim 2, which is 2,6-dichlorobenzaldoxime - O-[2-chloro-4-ethylamino-s-triazinyl-(6)]-ether 5. The compound of claim 2, which is 2,6-dichlorobenzaldoxime - O-[2-chloro-4-methylthio-s-triazinyl-(6)]-ether.

6. The compound of claim 2, which is 2,6-dichlorobenzaldoxime - O - [2-chloro-4-methoxy-s-triazinyl-(6)]-ether.

7. The compound of claim 2, which is 2,6-dichlorobenzaldoxime - O - [2-chloro-4-phenoxy-s-triazinyl-(6)]-ether.

8. The compound of claim 2, which is 2,6-dichlorobenzaldoxime - O - (2 - chloro-4-anilino-s-triazinyl-(6))-ether.

9. The compound of claim 2, which is 2,6-dichlorobenzaldoxime - O - (2-chloro - 4-amino-s-triazinyl-(6))-ether.

10. The compound of claim 2, which is 2,6-dichlorobenzaldoxime - O - (2-chloro-4-n-octylamino-s-triazinyl-(6))-ether.

11. The compound of claim 2, which is 2,6-dichlorobenzaldoxime - O - (2-chloro-4-diethyl-amino-s-trianzinyl (6))-ether.

References Cited
UNITED STATES PATENTS
3,671,523   6/1972   Westphal et al. __ 260—240 G X JOHN M. FORD, Primary Examiner U.S. Cl. X.R.
71—93